(12) United States Patent
Shibata (10) Patent No.: US 6,592,175 B2
(45) Date of Patent: Jul. 15, 2003

(54) VEHICLE BODY STRUCTURE

(75) Inventor: Koji Shibata, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/109,610

(22) Filed: Mar. 28, 2002

(65) Prior Publication Data

US 2002/0163226 A1 Nov. 7, 2002

(30) Foreign Application Priority Data

Mar. 28, 2001 (JP) ........................................ 2001-093573

(51) Int. Cl.7 ................................................ B62D 25/08
(52) U.S. Cl. .................................. 296/203.02; 296/188
(58) Field of Search ........................... 296/203.02, 204, 296/194, 188

(56) References Cited

U.S. PATENT DOCUMENTS 4,804,222 A * 2/1989 Sakiyama et al. ..... 296/203.02
6,145,923 A * 11/2000 Masuda ............. 296/203.02 X
2002/0017804 A1 * 2/2002 Kroning et al. ........ 296/203.02

FOREIGN PATENT DOCUMENTS

JP 404050083 * 2/1992 ................. 296/204

* cited by examiner

Primary Examiner—Dennis H. Pedder
(74) Attorney, Agent, or Firm—Rossi & Associates

(57) ABSTRACT

A vehicle body structure includes a front side member disposed at a side of an engine compartment at a front of the vehicle body. The front side member extends in a longitudinal direction and has a rear part thereof extending to a fire wall and a lower surface of a floor panel. The total height of the front side member is increased by drawing sheet metal to form a plurality of longitudinal reinforcing members having substantially hat shaped cross-sections by and vertically stacking the members. This enlarges the total height of the front side member improves the rigidity of the front side member to prevent the deformation of the fire wall.

4 Claims, 7 Drawing Sheets

VEHICLE BODY STRUCTURE

FIELD OF THE INVENTION

This invention relates to a vehicle body structure having a front side member constituting a portion of a front body frame. More specifically, the total height of the front side member is increased by drawing sheet metal to form a plurality of longitudinal reinforcing members having substantially hat shaped cross-sections and vertically stacking the members.

BACKGROUND OF THE INVENTION

Figure 10:
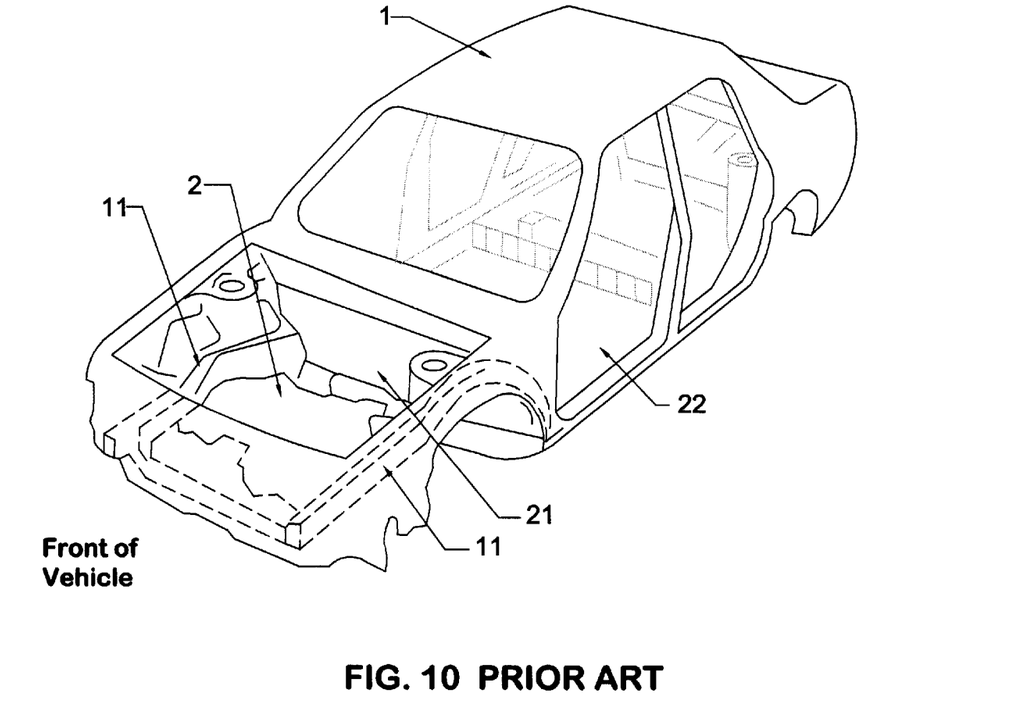
FIG. 10 is a perspective view showing a conventional vehicle body structure.

As shown in FIG. 10, a front side portion of a vehicle body 1 of an automobile is provided with a front side member 11 extending in the longitudinal direction of the automobile. The front side member 11 constitutes a part of a frame of a front of the vehicle body, and it usually has a front end thereof supporting a front bumper, etc., an intermediate part thereof receiving an input of a suspension, and a rear end. The front end of the front side member 11 is positioned at the side of an engine compartment 2, and the rear end of the front side member 11 extends from a bottom of a dash panel or firewall 21 to a lower surface of a front part of a floor panel 22.

Figure 11:
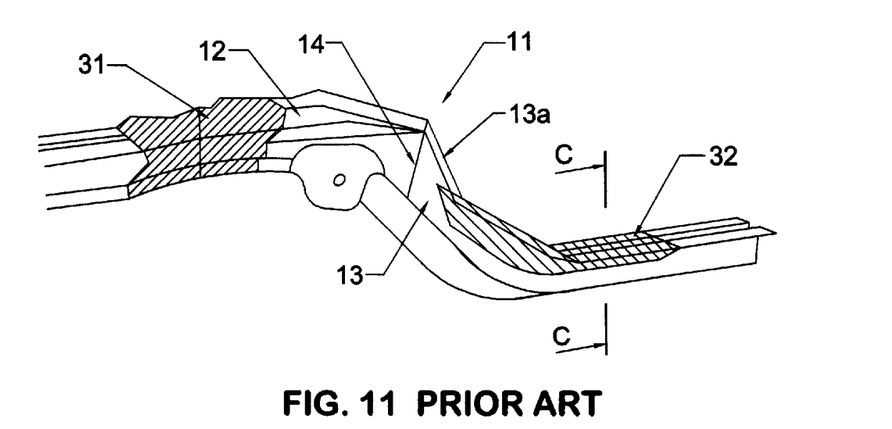
FIG. 11 is a perspective view showing a principal part of a front side member in the conventional vehicle body structure.

FIG. 11 is a perspective view showing an example of a conventional front side member 11 (the one at the left side of a vehicle body). As shown in FIG. 11, the front side member 11 is comprised of a side member front part 12 and a side member rear part 13, which are joined together at a joint 14. The side member front part 12 is usually formed to have a rectangular closed cross-section. The side member rear part 13 cooperates with the fire wall 21 and the floor panel 22 to typically form a rectangular closed cross-section. Reference numeral 13a denotes a flange portion that joins the side member rear part 13 to the respective lower surfaces of the fire wall 21 and the floor panel 22.

A reinforcement 31 is mounted at a position where the side member front part 12 receives the input of the suspension (as indicated by the diagonal lines) in order to ensure a sufficient rigidity to resist the input of the suspension.

Figure 12:
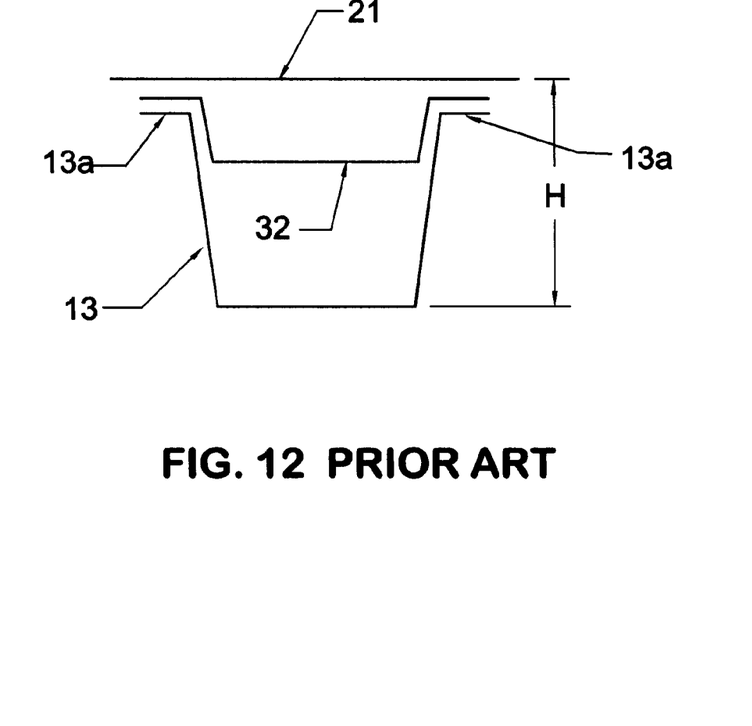
FIG. 12 is a cross-sectional view showing a front side member rear part in the conventional vehicle body structure (a cross-sectional view taken perpendicular to arrow C—C in FIG. 11)

On the other hand, the side member rear part 13 joined to the bottom of the fire wall 21 must have sufficient rigidity in order to prevent the bottom of the fire wall 21 from deforming in the event of a crash of the vehicle. To improve the rigidity, the cross-section of the side member rear part 13 is preferably enlarged (in particular, an area joined to the fire wall 21 is enlarged). In terms of machining, however, it is difficult to simply enlarge the cross-section of the side member rear part 13. Therefore, under the present circumstances, a second reinforcement 32 is added to the interior of the side member rear part 13 to ensure the rigidity as shown in FIG. 12. FIG. 12 is a cross-sectional view taken perpendicular to an arrow C—C in FIG. 11.

More specifically, the side member rear part 13 is usually formed to have a substantially hat-shaped cross-section that is opened upward (toward the fire wall 21) as shown in FIG. 12 so that it can be joined to the bottom (at the outside of a vehicle compartment) of the fire wall 21. A flange portion 13a at the upper opening side is joined to the bottom of the fire wall 21.

Figure 13:
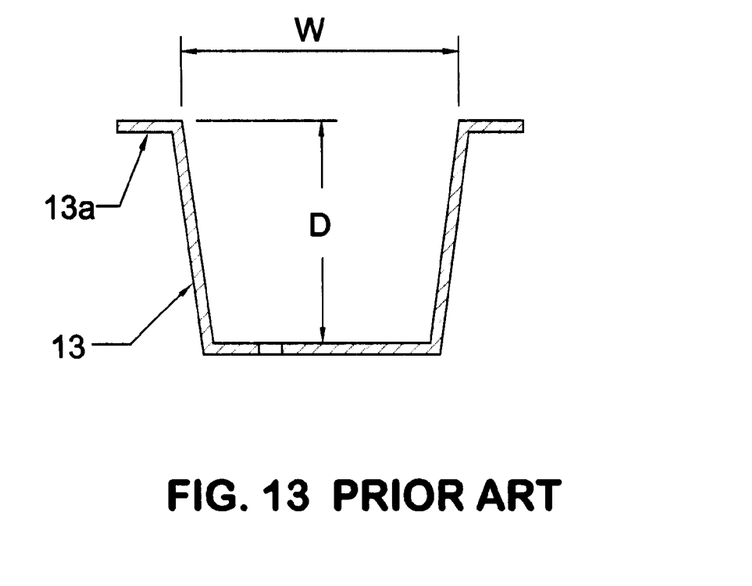
FIG. 13 is a cross-sectional view conceptually showing components of the front side member rear part in the conventional vehicle body structure.

Such a reinforcing member, having the substantially hat-shaped cross-section, is formed by drawing of a metal sheet member. However, an increase in the drawing depth D of the reinforcing member (see FIG. 13) (usually, the increase in the ratio of the drawing depth D to the width W, i.e. D/W) makes the drawing process more difficult. In particular, the increase in the board thickness of sheet metal material makes it difficult to draw the reinforcing member in an increased drawing depth D (deep drawing). In the case of the side member rear part 13, the sheet metal material must be thick due to the necessity of ensuring sufficient strength and rigidity, and the width W thereof is restricted in terms of the arrangement with the other vehicle components. This results in the restriction on the drawing depth D.

Accordingly, as shown in FIG. 12, the reinforcement 32 is added to the interior of the side member rear part 13 to ensure rigidity.

Therefore, the cross-section of the side member rear part 13 opened toward to the fire wall 21 (i.e. the total height of the side member rear part 13) H is restricted according to the drawing depth D.

Incidentally, increasing the total height H of the side member rear part 13 is the most efficient way to prevent the deformation of the fire wall 21.

There is space below the side member rear part 13, but the wheel well is provided there. Therefore, in terms of the space, it is not possible to extend the side member rear part 13 and the rear part of the side member front part 12 downward to increase the total height H.

In view of the above, it would be desirable to provide a vehicle body structure that increases the total height of a front side member to efficiently improve the rigidity of a front side member to prevent deformation of the fire wall.

SUMMARY OF THE INVENTION

The invention provides a vehicle body structure that improves rigidity by utilizing a longitudinal front side member of a vehicle body frame which includes a front part which extends from a front bumper to a joint and a rear part which extends from the joint to a firewall and a floor panel. The rear part includes stacked longitudinal reinforcing members, each member having a substantially hat shaped cross section which includes two sides and a bottom, an overlap margin where an uppermost portion of the sides of one longitudinal reinforcing member is coupled to a lowermost portion of the sides of another overlying reinforcing member, a drawing depth of each member which is measured perpendicular to the bottom of each member, and a total height which equals a sum of the drawing depths of each member minus the overlap margin between each of the members.

More specifically, the reinforcing members having the substantially hat-shaped cross-sections can easily be formed by drawing of sheet metal members, but the drawing depth equivalent to the height of the substantially hat-shaped cross-section is restricted in the case of the drawing. In particular, since the front side member is made of a rigid sheet material with a great board thickness, it is impossible to increase the drawing depth D of the members having the substantially hat-shaped cross-sections (i.e. the height of a part joined to the fire wall). On the other hand, in the vehicle body structure according to the present invention, the plurality of reinforcing members are stacked on the fire wall, and therefore, the height of the front side member is increased according to the sum of the drawing depths or height of the stacked reinforcing members less the joint margins of the reinforcing members.

Therefore, the part of the front side member joined to the fire wall is increased in height while the reinforcing members are machined by a drawing process, which can easily be performed with excellent machinability although the drawing depth is restricted. It is therefore possible to increase the total height of the part of front side member joined to the fire wall to efficiently improve the fire wall supporting rigidity without raising the component manufacturing cost or the like.

The improvement in the rigidity of the front side member surely prevents the fire wall from deforming in the event of a vehicular crash.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 1(a) to 1(b) are diagrams showing a vehicle body structure according to an embodiment of the present invention, wherein

DETAILED DESCRIPTION OF THE PREFERRED EMBODIMENTS

A preferred embodiment of the present invention will now be described with reference to the accompanying drawings. FIGS. 1 to 9 show a vehicle body structure according to the present invention.

The vehicle body structure according to the present embodiment is characterized by a front side member 11 installed in a front side portion of a vehicle body 1 of an automobile. As shown in FIG. 10, the front side member 11 is disposed at the side of an engine compartment 2 at the front of the vehicle body 1 of the automobile in such a way as to extend in the longitudinal direction. The front member 11 has a front end thereof supporting a front bumper, an intermediate part thereof receiving an input of a suspension, and a rear end thereof extending from the bottom of a dash pandel or fire wall 21 to a lower surface of the front part of a floor panel 22.

Figures 1, 1A:
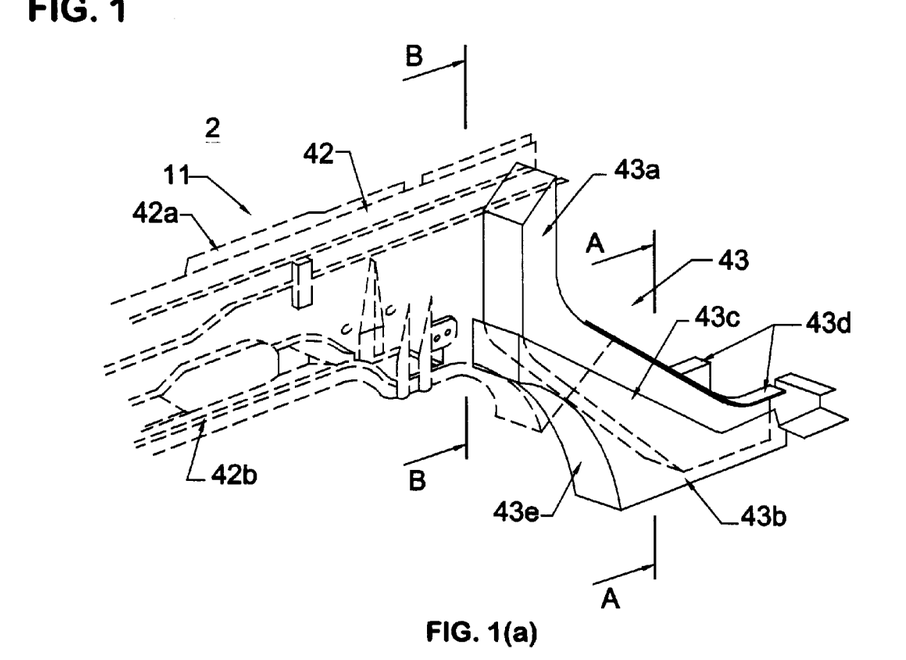
FIG. 1(a) is a perspective view showing a principal part of a front side member in the vehicle body structure.
Figure 2:
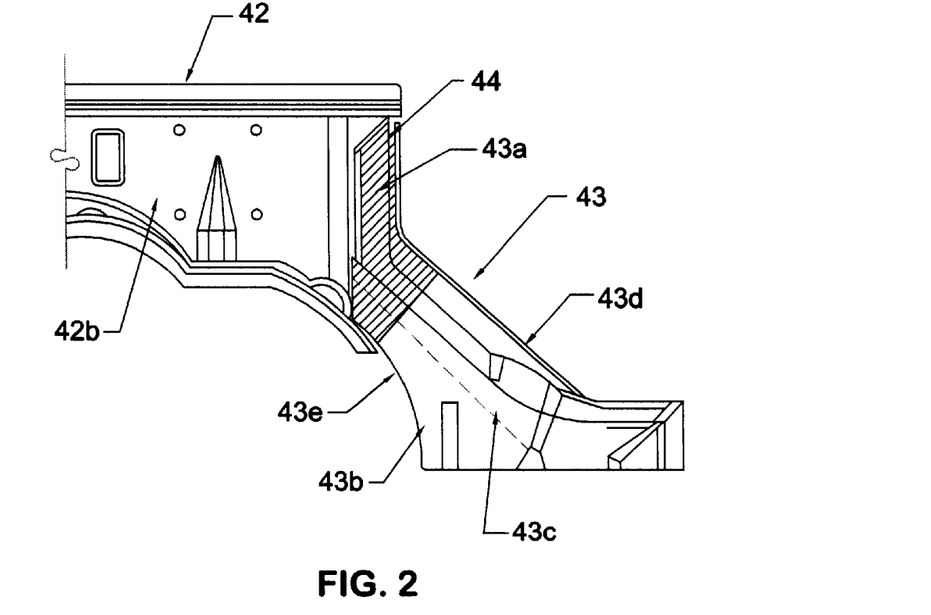
FIG. 2 is a side view showing a principal part of the front side member in the vehicle body structure according to the embodiment of the present invention.

As shown in a perspective view of FIG. 1(a) and a side view of FIG. 2, the front side member 11 is comprised of a side member front part 42 and a side member rear part 43, which are joined to each other at a joint 44 (indicated by the diagonal lines in FIG. 2). The front side member 11 is similar to that of the prior art in that the side member front part 42 and the side member rear part 43 are preferably formed to have rectangular closed cross-sections. The side member rear part 43 is joined to the respective lower surfaces of the fire wall 21 and the floor panel 22 as is the case with the side member rear part 13 of the prior art, and the intermediate part of the side member front part 42 receives the input of the suspension as is the case with the side member front part 12 of the prior art.

Figure 1B:
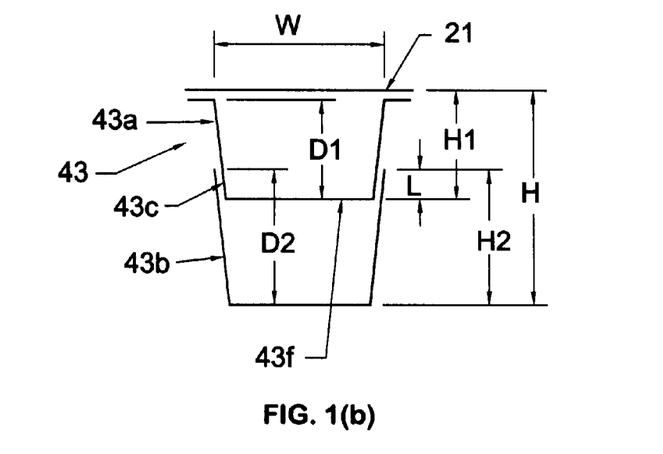
FIG. 1(b) is a cross-cross-sectional view conceptually showing the front side member (a cross-sectional view taken perpendicular to arrow A—A in FIG. 1(a))

The front side member 11 is characterized by the side member rear part 43 and the rear end of the side member front part 42 being joined to the side member rear part 43, at joint 44. As shown in FIG. 1(b), the height H of the side member rear part is increased by stacking a plurality of reinforcing members 43a, 43b (two members are used in this embodiment) having substantially hat-shaped cross-sections on the fire wall 21 (in the vertical direction or the vertical direction inclined toward the rear of the vehicle body). Although the reinforcing members 43a, 43b are components of the side member rear part 43, they are called the reinforcing members since they reinforce the fire wall 21 and the floor panel 22.

The reinforcing members 43a, 43b are formed by drawing of sheet metal members. Increasing the drawing depth D1, D2 thereof (usually, the increase in the ratios of the drawing depth D1, D2 to the width W, i.e. D1/W and D2/W) makes the drawing process more difficult, and the increase in the thickness of sheet metal materials also makes it difficult to draw the reinforcing members into an increased drawing depth D. In the case of the side member rear part 43, the large thickness of sheet metal material and the restriction on the width W restricts the drawing depth D1, D2 of the reinforcing members 43a, 43b and the individual heights H1, H2 of the reinforcing members 43a, 43b (H1≈D1, H2≈D2).

However, the side member rear part 43 according to the present embodiment is comprised of the reinforcing members 43a, 43b stacked on the fire wall 21, so that the total height H of the side member rear part 43 is equal to a value that is found by subtracting overlap margin L of the reinforcing members 43a, 43b from the sum of the individual heights H1, H2 of the reinforcing members 43a, 43b (H=H1+H2−L). Therefore, the total height H of the rear part 43 is larger than the respective individual heights H1, H2 of the reinforcing members 43a, 43b.

The reinforcing members 43a, 43b are secured to each other in an overlapping area 43c by spot welding or the like. In the side member rear part 43 which is comprised of the joined reinforcing members 43a, 43b, a flange portion 43d formed at the reinforcing member 43a is secured to the reverse side of the fire wall 21 by spot welding or the like. Therefore, as shown in FIG. 1(b), the side member rear part 43 has two upper and lower closed cross-sections, and a bottom portion 43f of the reinforcing member 43a is located in the intermediate part of the side member rear part 43 in the vertical direction. Thus, the side member rear part 43 is not only enlarged vertically in its cross-section but also includes a reinforcing member 43f therein.

The reinforcing members 43a, 43b are actually formed to have complicated curved surfaces as shown in FIG. 1(a) and FIGS. 2 to 4, but stacking the reinforcing members 43a, 43b on the fire wall 21 extends a bottom 43e of the side member rear part 43 to a position in proximity to a wheel well as shown in FIG. 1(a) and FIGS. 2 to 5.

Figure 3:
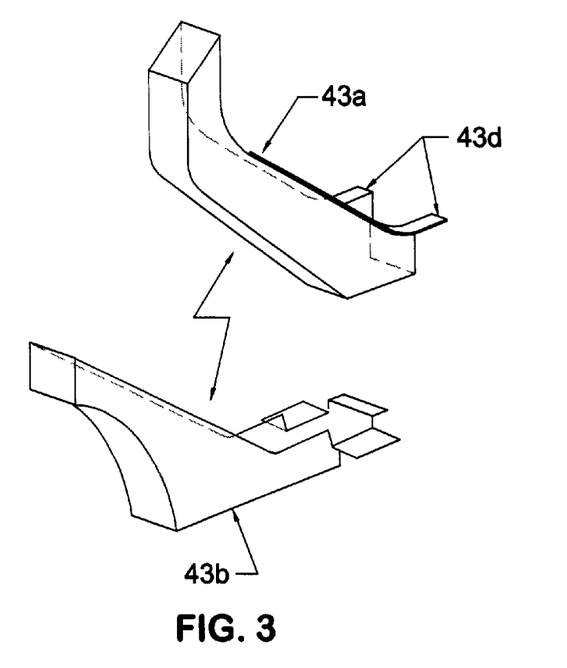
FIG. 3 is an exploded perspective view conceptually showing a front side member rear part in the vehicle body structure according to the embodiment of the present invention.
Figure 4:
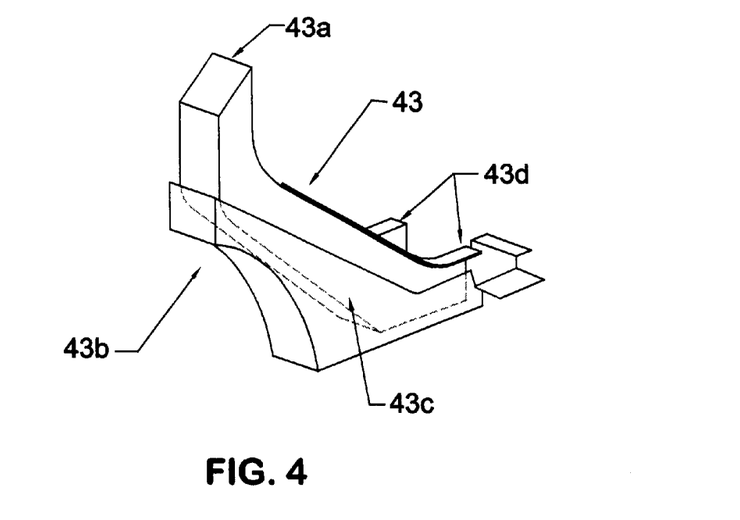
FIG. 4 is an assembly perspective diagram conceptually showing the front side member rear part in the vehicle body structure according to the embodiment of the present invention.
Figure 5:
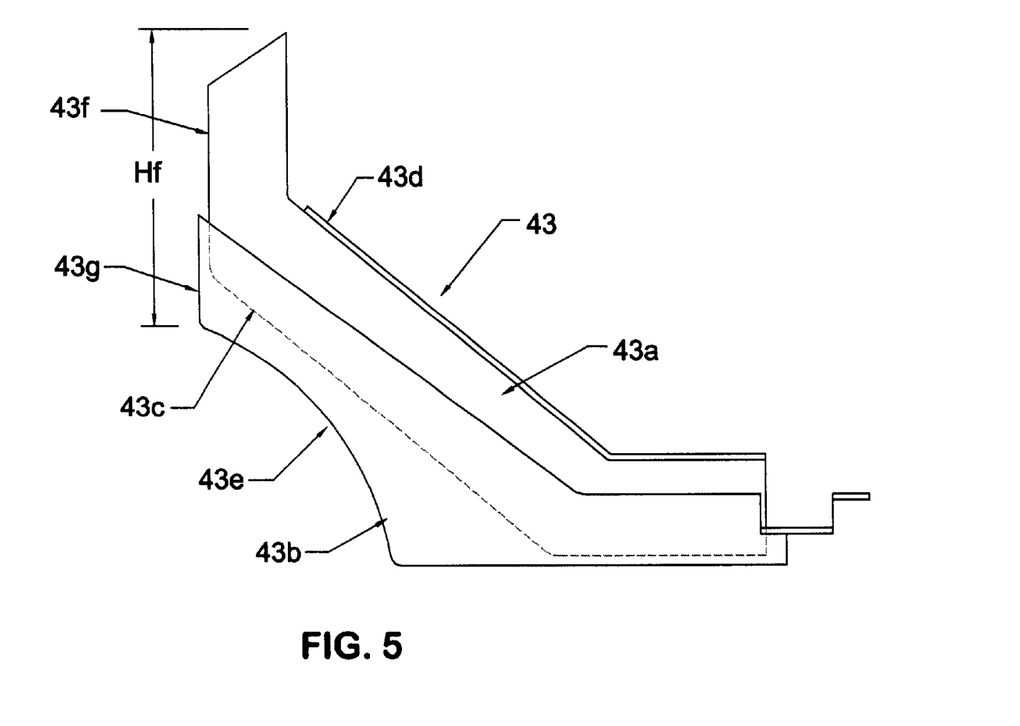
FIG. 5 is a side view conceptually showing the front side member rear part in the vehicle body structure according to the embodiment of the present invention.

As shown in FIGS. 3–5, at the front end of the side member rear part 43, the entire upper reinforcing member 43a including the bottom portion 43f are bent upward and the lower reinforcing member 43b has the bottom thereof bent upward to form an end wall 43g, so that the lower reinforcing member 43b is joined to the bottom 43f of the reinforcing member 43a in an overlapping manner. The front end of the side member rear part 43 is comprised of the bottom 43f and the end wall 43g so that the height Hf (the height in the vertical direction) of the front end of the side member rear part 43 can be further increased.

Figure 6:
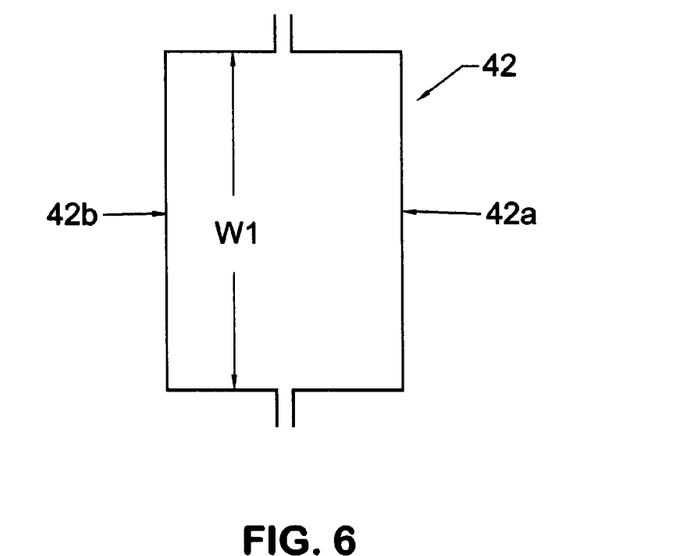
FIG. 6 is a cross-sectional view conceptually showing a front side member front part in the vehicle body structure according to the embodiment of the present invention (a cross-sectional view taken perpendicular to arrow B—B in FIG. 1(a))

On the other hand, as shown in FIGS. 1(a) and 6, the side member front part 42 is comprised of an inner member 42a disposed inward in the vehicle body (at the side of the engine compartment 2) and an outer member 42b disposed outward in the vehicle body exterior to the engine compartment 2, which are secured to each other by spot welding or the like. The direction of the width W1 of the respective members 42a, 42b corresponds to the direction of the total height H.

The respective width W1 of the inner member 42a and the outer member 42b at the rear end of the side member front part 42 is increased to become equal to the height (the height in the vertical direction) Hf of the front end of the side member rear part 43, and the lower portion of the rear end of the side member front part 42 is extended to become closer to the wheel well so that the rear end of the side member front part 42 can be joined smoothly to the front end of the side member rear part 43.

With the above arrangement of the vehicle body structure according to the embodiment of the present invention, the side member rear part 43 joined to the bottom of the fire wall 21 and the rear end of the side member front part 42 joined to the front end of the side member 43 are enlarged in a direction to support the fire wall 21 (the vertical direction or the vertical direction inclined to the rear of the vehicle body). This is the most efficient way to improve the rigidity for supporting the fire wall 21.

More specifically, the total height H of the side member rear part 43 joined to the bottom of the fire wall 21 is increased in the supporting direction, and the height of the rear end of the side member front part 42 joined to the front end of the side member rear part 43 (the width W1 of the inner member 42a and the outer member 42b) is increased in the supporting direction. This improves the rigidity for supporting the fire wall 21 in an extremely efficient manner.

Therefore, even if the bottom of the fire wall 21 receives such a force to cause deformation thereof in the event of a vehicular crash, the high supporting rigidity of the rear part 43 and the front part 42 prevents the bottom of the fire wall 21 from deforming.

It should be understood, however, that there is no intention to limit the invention to the embodiment disclosed, but on the contrary, the invention is to cover all modifications, alternate constructions and equivalents falling within the spirit and scope of the invention as expressed in the appended claims.

Figure 7:
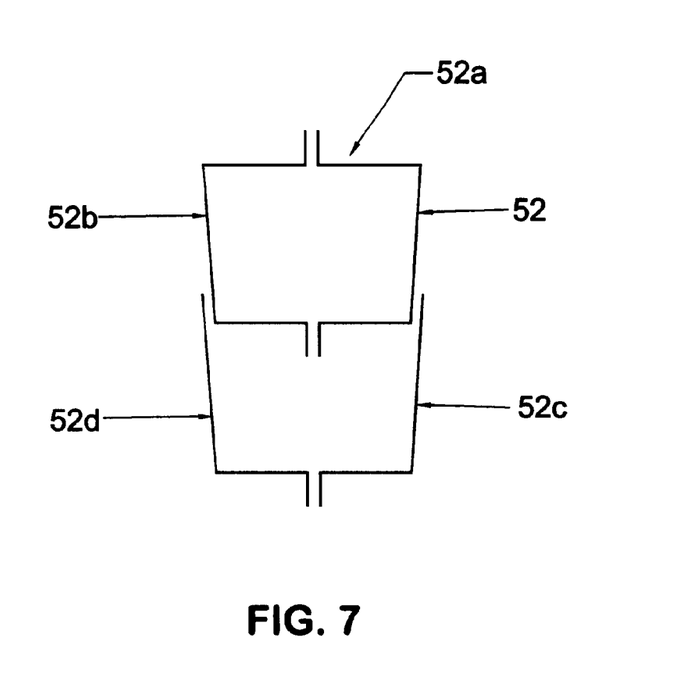
FIG. 7 is a cross-sectional view conceptually showing a modification example of the front side member front part in the vehicle body structure according to the embodiment of the present invention (a cross-sectional view taken perpendicular to arrow B—B corresponding to FIG. 6)

For example, as shown in FIG. 7, cross-section B—B the front part 52 may comprise a pair of members having substantially hat-shaped cross-sections 52a, 52b and a pair of members having L-shaped cross-sections 52c and 52d joined to the bottoms of the substantially hat-shaped members 52a, 52b. In this case, the hat-shaped member 52a and the L-shaped member 52c are joined together to form an inner member, and the hat-shaped member 52b and the L-shaped member 52d are joined together to form an outer member.

Figure 8:
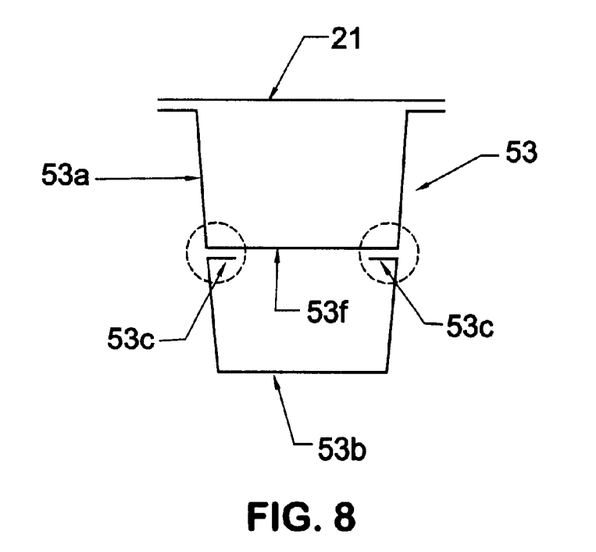
FIG. 8 is a cross-sectional view conceptually showing the first modification example of the front side member rear part in the vehicle body structure according to the embodiment of the present invention (a cross-sectional view taken perpendicular to arrow A—A corresponding to FIG. 1(b))

Also, as shown in FIG. 8 the rear part 53 may comprise a pair of upper and lower members having substantially hat-shaped cross-sections 53a, 53b, which are joined together. In this case, the top end of the lower hat-shaped member 53b is bent inward, and the bent flange portions 53c, 53c are joined to a bottom 53f of the upper hat-shaped member 53a.

Figure 9:
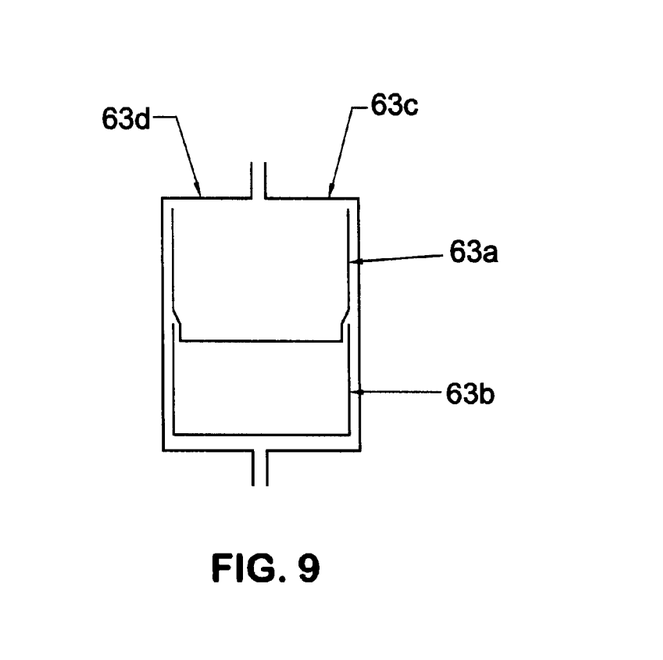
FIG. 9 is a cross-sectional view conceptually showing the first modification example of the front side member rear part in the vehicle body structure according to the embodiment of the present invention (a cross-sectional view corresponding to FIG. 1(b))

In addition, as shown in FIG. 9, in the vicinity of the joint 44 where the front part and the rear part are joined, the rear part 63 may comprise a pair of right and left members having substantially hat-shaped cross-sections 63c, 63d, which are joined to a pair of joined upper and lower members having U-shaped cross-sections 63a, 63b in such a way as to enclose the U-shaped members 63a, 63b from outside. In the above-described embodiment, such arrangement is used for the joint 44 at which the front end of the side member rear part 43 and the rear end of the side member front part 42 are joined together, thus improving the rigidity to a large degree.

What is claimed is:

1. A vehicle body structure comprising:
   an engine compartment;
   a floor panel; and
   a front side member disposed at a side of the engine compartment at a front of the vehicle body structure in such a way as to extend in a longitudinal direction of the vehicle body structure,
   wherein the front side member includes a rear part that extends toward the floor panel and includes a plurality of stacked reinforcing members,
   wherein an uppermost portion of one reinforcing member is coupled to a lowermost portion of another reinforcing member to form an overlap area,
   wherein each reinforcing member has a defined drawing depth, and wherein a total height of the rear part equals a sum of depths of each reinforcing member less the overlap area,
   wherein said front side member further comprises a front part that includes an inner member and outer member, wherein a direction of a defined width of the inner member and the outer member corresponds to a direction of the total height of the rear part, and wherein the inner member comprises a first hat-shaped member joined together with a first L-shaped member and the outer member comprises a second hat-shaped member joined together with a second L-shaped member.

2. A vehicle body structure as claimed in claim 1, wherein the width of the inner member and the outer member at a rear end of the front part is substantially equal to the total height of the rear part.

3. A vehicle body structure comprising:

an engine compartment;

a floor panel; and a front side member disposed at a side of the engine compartment at a front of the vehicle body structure in such a way as to extend in a longitudinal direction of the vehicle body structure, wherein the front side member includes a rear part that extends toward the floor panel and includes a plurality of stacked reinforcing members, wherein the rear part comprises an upper hat-shaped member and a lower hat-shaped member is bent inward to form a flange portion that is joined to a bottom of the upper hat-shaped member.

4. A vehicle body structure comprising:

an engine compartment;

a floor panel; and a front side member disposed at a side of the engine compartment at a front of the vehicle body structure in such a way as to extend in a longitudinal direction of the vehicle body structure, wherein the front side member includes a rear part that extends toward the floor panel and includes a plurality of stacked reinforcing members, and wherein the rear part comprises a substantially hat-shaped right member and a substantially hat-shaped left member that are joined to a pair of stacked upper and lower U-shaped members, such that the right member and left member enclose the U-shaped members.

* * * * *